US008464906B2

(12) United States Patent
Macler

(10) Patent No.: US 8,464,906 B2
(45) Date of Patent: Jun. 18, 2013

(54) BAG COOLER EMPLOYING A MULTI-SPIKE ADAPTER AND CONVERTER

(75) Inventor: Jeffrey Macler, Tecumseh, MO (US)

(73) Assignee: International Packaging Innovations, LLC, Tecumseh, MO (US)

( * ) Notice: Subject to any disclaimer, the term of this patent is extended or adjusted under 35 U.S.C. 154(b) by 0 days.

(21) Appl. No.: 13/446,386

(22) Filed: Apr. 13, 2012

(65) Prior Publication Data

US 2012/0193373 A1 Aug. 2, 2012

Related U.S. Application Data

(63) Continuation of application No. 11/691,974, filed on Mar. 27, 2007, now Pat. No. 8,177,096.

(51) Int. Cl.
*G01F 11/00* (2006.01)

(52) U.S. Cl.
USPC .................. 222/1; 222/83; 222/83.5; 222/85; 222/86; 222/105; 222/185.1; 222/485.1

(58) Field of Classification Search
USPC .............. 222/1, 80–83, 83.5, 85–88, 90, 105, 222/481.5, 181.1, 325, 183, 185.1; 239/272; 141/309, 329–330; 604/183, 86, 411, 414, 604/415; 206/524.8, 428, 524.3, 524.6
See application file for complete search history.

(56) References Cited

U.S. PATENT DOCUMENTS

| | | | | |
|---|---|---|---|---|
| 1,316,122 | A | | 9/1919 | Vall |
| 1,364,889 | A | | 1/1921 | Rupp |
| 1,889,557 | A | | 4/1932 | Lange |
| 2,655,286 | A | * | 10/1953 | Barbaro .......................... 222/82 |
| 2,825,334 | A | * | 3/1958 | Kas, Sr. ........................ 604/183 |
| 2,986,142 | A | * | 5/1961 | Bieberdorf et al. ........... 604/262 |
| 3,092,106 | A | | 6/1963 | Butler |
| 3,239,104 | A | | 3/1966 | Scholle |
| 3,435,990 | A | | 4/1969 | Pike, Jr. |
| 3,587,934 | A | | 6/1971 | Elmore |
| 3,688,950 | A | | 9/1972 | Parish |
| 3,813,009 | A | | 5/1974 | Lenz |

(Continued)

FOREIGN PATENT DOCUMENTS

| | | |
|---|---|---|
| CA | 1229073 | 8/1985 |
| CA | 1192164 | 11/1987 |

(Continued)

OTHER PUBLICATIONS

Webpage—http://www.concessionstands/com/itemdesc.asp?Cartid=8002691GSS-EVEREST-VO750 . . . , "JARCO: Server Express Rectangular Stainless, Model 07020," printed on Oct. 22, 2004, p. 1-2.

(Continued)

*Primary Examiner* — Frederick C Nicolas
(74) *Attorney, Agent, or Firm* — Lewis, Rice & Fingersh, L.C.

(57) ABSTRACT

A system for dispensing fluids wherein a support structure holds bulk fluid contained within a bag that is transferred from the bag to an enclosed chamber in a dispensing base, from which chamber the fluid is dispensed, via a puncturing device utilizing multiple spikes. After dispensing air pressure in the enclosed chamber is equalized with the air pressure acting on the bulk fluid by at least one of the spikes.

2 Claims, 8 Drawing Sheets

U.S. PATENT DOCUMENTS

| | | | | | |
|---|---|---|---|---|---|
| 3,848,776 | A | | 11/1974 | Schieser | |
| 4,150,744 | A | * | 4/1979 | Fennimore | 206/205 |
| 4,293,081 | A | | 10/1981 | Kuckens | |
| 4,296,786 | A | | 10/1981 | Brignola | |
| 4,322,465 | A | * | 3/1982 | Webster | 428/194 |
| 4,449,631 | A | * | 5/1984 | Levenberg et al. | 206/459.1 |
| 4,527,716 | A | | 7/1985 | Haas et al. | |
| 4,548,605 | A | * | 10/1985 | Iwamoto et al. | 604/410 |
| 4,561,560 | A | | 12/1985 | Lyon | |
| 4,755,292 | A | | 7/1988 | Merriam | |
| 4,793,514 | A | | 12/1988 | Sheets | |
| 4,801,007 | A | | 1/1989 | Rule | |
| 4,846,236 | A | | 7/1989 | Deruntz | |
| 4,865,218 | A | | 9/1989 | Derby et al. | |
| 4,936,829 | A | * | 6/1990 | Zdeb et al. | 604/85 |
| 5,049,129 | A | * | 9/1991 | Zdeb et al. | 604/85 |
| 5,141,134 | A | | 8/1992 | Machado | |
| 5,217,118 | A | * | 6/1993 | Mochizuki et al. | 206/524.2 |
| 5,224,619 | A | | 7/1993 | Dilworth et al. | |
| 5,251,786 | A | * | 10/1993 | Sarrine | 222/82 |
| 5,270,219 | A | * | 12/1993 | DeCastro et al. | 436/180 |
| 5,281,027 | A | | 1/1994 | Thrall | |
| 5,358,501 | A | | 10/1994 | Meyer | |
| 5,405,053 | A | | 4/1995 | Zublin | |
| D361,838 | S | | 8/1995 | Kuhn et al. | |
| 5,551,606 | A | | 9/1996 | Rai et al. | |
| 5,567,322 | A | | 10/1996 | Rundle et al. | |
| 5,573,047 | A | | 11/1996 | Akin | |
| 5,645,913 | A | | 7/1997 | Rogers | |
| 5,691,015 | A | | 11/1997 | Tsukamoto et al. | |
| 5,944,232 | A | | 8/1999 | Hestehave et al. | |
| 5,967,197 | A | | 10/1999 | Shown | |
| 6,026,988 | A | | 2/2000 | Teetsel, III et al. | |
| 6,095,433 | A | | 8/2000 | Langdon | |
| 6,098,844 | A | | 8/2000 | Nicolle | |
| 6,116,467 | A | | 9/2000 | Petriekis | |
| 6,149,034 | A | | 11/2000 | Amberg et al. | |
| 6,207,046 | B1 | | 3/2001 | Yamashita et al. | |
| 6,223,940 | B1 | | 5/2001 | Quinn | |
| 6,386,392 | B1 | | 5/2002 | Argentieri et al. | |
| 6,398,073 | B1 | | 6/2002 | Nicolle | |
| 6,442,960 | B1 | | 9/2002 | Fournier et al. | |
| 6,557,735 | B1 | | 5/2003 | Stray | |
| 6,613,036 | B1 | * | 9/2003 | Farmer et al. | 604/408 |
| 6,685,056 | B1 | * | 2/2004 | Argentieri et al. | 222/83.5 |
| 6,726,061 | B2 | | 4/2004 | Good | |
| 7,331,487 | B2 | * | 2/2008 | Macler et al. | 222/83 |
| 8,177,096 | B2 | * | 5/2012 | Macler | 222/85 |
| 2005/0092769 | A1 | | 5/2005 | Macler et al. | |
| 2007/0154119 | A1 | * | 7/2007 | Macler et al. | 383/111 |

FOREIGN PATENT DOCUMENTS

| | | |
|---|---|---|
| CN | 98213085.6 | 6/1999 |
| CN | 98215283.3 | 7/1999 |
| CN | 99209220.5 | 4/2000 |
| CN | 99246066.2 | 9/2000 |
| CN | 99246067.0 | 9/2000 |
| CN | 99254569.2 | 2/2001 |
| CN | 00237624.5 | 5/2001 |
| CN | 00237625.3 | 7/2001 |
| CN | 03209721.2 | 8/2004 |
| CN | 03231908.8 | 8/2004 |
| CN | 03231906.1 | 9/2004 |
| CN | 03210115.5 | 10/2004 |
| CN | 200320100534.9 | 3/2005 |
| CN | 200410052994.8 | 3/2005 |
| CN | 200410067280.4 | 3/2005 |
| CN | 200420005755.2 | 3/2005 |
| CN | 200420037745.7 | 7/2005 |
| CN | 200420107401.9 | 11/2005 |
| EP | 0250640 | 1/1988 |
| FR | 2685293 | 6/1993 |

OTHER PUBLICATIONS

Webpage—http://www.sealedair.com/library/casehit/rtm_resthtml, "RTM Restaurant Group—Cryovac Division of Seal Air Case History," printed on Oct. 22, 2004, p. 1-5.

Webpage—http://pelv2003.packexop.com,/pelv2003/packaging_suppliers/ve/pr/33953/970.html, "Sealed Air Corporation, Cryovac to Showcase the Advantage and Efficiencies for Flexible Packaging at IEFP Booth #E7612," printed on Oct. 22, 2004, p. 1-3.

Webpage—http://www.server-products.com/sepouch.htm, "Condiment Pumps—Server Express System," printed on Oct. 22, 2004, p. 1-3.

International Search Report, International Patent Application No. PCT/US07172766, mailed on Apr. 11, 2008, 9 pages.

* cited by examiner

BAG COOLER EMPLOYING A MULTI-SPIKE ADAPTER AND CONVERTER

CROSS REFERENCE TO RELATED APPLICATION(S)

This application is a Continuation of U.S. patent application Ser. No. 11/691,974, filed Mar. 27, 2007 now U.S. Pat. No. 8,177,096 and currently pending, the entire disclosure of which is incorporated herein by reference.

BACKGROUND

1. Field of the Invention

The present invention relates to a system for dispensing fluids. In particular, the present invention relates to a fluid dispensing system wherein a bagged fluid, such as water, is dispensed, via a puncturing device utilizing multiple spikes.

2. Description of the Related Art

Conventional domestic fluid dispensers used primarily for providing heated or cooled water are usually free standing devices which dispense sterilized or mineral water from large rigid water bottles. The rigid water bottles have a large body portion and a narrow neck portion having a mouth opening, and are coupled to the water dispenser by inverting the bottle and positioning the mouth of the bottle in the chamber of the water dispenser. Air, introduced into the water bottle through the mouth, allows water to be dispensed from the inverted bottle until the water level in the chamber reaches the mouth of the bottle. Since the water bottle is rigid, once the water level in the chamber reaches the mouth of the bottle no more air can enter the bottle, so water remaining in the inverted bottle is retained in the bottle due to the difference between the air pressure external to the inverted bottle and the air pressure inside the bottle. Water is then dispensed from the chamber through a conduit attached to a valve at the opposite end from the chamber. When the level of water in the chamber falls below the mouth of the water bottle, air enters the water bottle, allowing water to flow from the bottle until the water level in the chamber again reaches the mouth of the bottle.

Although conventional domestic water dispensers are widely used, they are deficient in a number of respects. First, water bottles used in the conventional domestic water dispenser usually contain a large quantity of sterilized water, typically on the order of about 5 gallons. Due to the weight and size of a bottle holding that amount of water, it is often difficult to invert and properly locate the mouth of the bottle in the chamber without spilling a quantity of the water.

Second, to prevent water from continuously flowing from the water bottle while the water bottle is inverted, the water bottles used with such water dispensers are fabricated from a thick, rigid, plastic material that can hold a vacuum without collapsing. Due to their cost, the water bottles are usually resterilized and reused after an initial use. As a result, the cost of shipping the empty water bottle back to the supplier for sterilization and reuse are adsorbed by the consumer through increased water costs.

Third, in order for the mouth of the water bottle to be positioned in the chamber of the cooler, the water bottles must have a neck, as described above. The presence of the neck, however, increases the difficulty in sterilizing the water bottles, since the neck may limit the ability of the sterilizing agents to reach all the interior parts of the bottle, even when large quantities of sterilizing agents are used. While the use of heat sterilization may overcome this problem to some extent, it is generally not possible to use heat sterilization on plastic bottles. Although, sterilization using ultraviolet light is possible, ultraviolet light sterilization may lead to an incomplete result. Particularly troublesome, once the bottle is inverted into the fluid dispenser, the outside of the neck of the bottle can contact the fluid, and it is very difficult to maintain this area of the bottle sterile.

Fourth, with the necessity of sterilizing the water bottles after each use, over time the rigid plastic water bottles may develop cracks or holes. If such failures occur while the water bottle is inverted in the water dispenser, air will enter the water bottle and allow water to flow uncontrollably from the mouth of the water bottle, allowing the chamber to eventually over flow. This water over flow can expose the purchaser's premises to the risk of water damage.

One solution to the problem of potential chamber overflow, and the necessity to make bottles of rigid materials to allow for the pressure differential described above, is to add a valve in the flow path between the bottle and the chamber. Such a valve allows the flow of water out of the bottle to be closed off so that the chamber does not overflow. Such a valve can operate automatically, opening and closing depending on the level of the fluid in the chamber A more recent development in fluid dispensing systems has been to utilize bags rather than bottles to transport and dispense water from an otherwise conventional fluid dispensing system ("office cooler"). Such a system is described in U.S. patent application Ser. No. 10/940,057 to Macler, et al., for example, the entire disclosure of which is incorporated herein by reference. The Macler application offers a device that dispenses fluid from a disposable or recyclable bag, and thereby affords some of the benefits associated therewith.

As described in the Macler application, however, to overcome the problem of over flowing the chamber since a collapsible bag cannot hold a reduced pressure headspace (as a rigid bottle does), the device described therein uses a vent to permit and control flow between the bag and the chamber. The vent runs parallel to the cooler's vertical axis, into which water flows when water is dispensed until the water level in the vent is level with the water level in the cooler. Such a vent straw equalizes the pressure within the bag with the ambient pressure.

Other options for addressing the pressure buildup may also address issues left unsolved by the vent straw. First, the vent straw opens into the ambient air. This breach of the bag's structural isolation from the surrounding environment can present problems. For one, it presents a break in an otherwise sealed system which can open the water path to contamination. Dirt, liquids, or airborne contaminants can enter the water through the vent. Such contamination is generally unlikely but in many water systems sealed water paths are desired. It is therefore desirable to solve the pressure flow problem with a device that discourages contaminants from entering the bag, and fluid from exiting the bag at occasions other than dispensation.

SUMMARY

The following is a summary of the invention in order to provide a basic understanding of some aspects of the invention. This summary is not intended to identify key or critical elements of the invention or to delineate the scope of the invention. The sole purpose of this section is to present some concepts of the invention in a simplified form as a prelude to the more detailed description that is presented later.

Described herein, among other things, is a liquid storage and dispensation device comprising a fluid dispensing system comprising a dispensing base, an enclosed chamber positioned interior to the base, a support external to the dispensing base, the support providing support for a bag containing fluid, a plurality of spikes situated to puncture the bag when the bag is supported by the support, wherein the plurality of spikes provides continuity of air and fluid flow between the chamber and the bag upon puncturing the bag, and wherein at least two spikes in the plurality of spikes protrude to different extents into the enclosed chamber, and a dispensing valve connected to the enclosed chamber allowing for dispensing from the enclosed chamber.

In an embodiment, when the dispensing valve is closed, the fluid in the bag will flow through a first spike in the plurality of spikes into the enclosed chamber and air in the enclosed chamber will flow through a second spike in the plurality of spikes into the bag. In a related embodiment, the maximum volume rate of fluid flow through the first spike into the chamber is limited to a value less than the maximum net volume rate of fluid flow out of the chamber through the dispensing valve taking into account the maximum volume rate of fluid flow into the chamber through the fluid passage from the bag, so that as fluid is dispensed out from the chamber through the valve at the maximum net volume rate of flow, the pressure in the chamber is reduced below the pressure external to the fluid dispensing system at the location of the end of the second spike opposite from the end of the second spike located in the chamber.

In another embodiment, the plurality of spikes are positioned in the support adjacent a point of local elevation minimum thereof. Another embodiment provides that the support is fabricated from a plastic resin material.

Another embodiment further comprises a bag containing fluid supported by the support and essentially sealed about each of the plurality of the spikes, each of the plurality of the spikes having punctured a wall of the bag. An embodiment of that bag is fabricated from a single-layer polyethylene sheet. In another embodiment of that bag, prior to the puncturing of the bag by each of the plurality of the spikes, a protective outer layer enclosing the bag is removed from about the bag.

Described herein is also a fluid dispensing system for dispensing fluid from a collapsible bag, comprising a support being capable of supporting the collapsible bag during dispensing of fluid from the bag and having a supporting surface with a point that can be oriented as a local minimum in elevation, the supporting surface defining a first space adjacent to a first side of the supporting surface and a second space on a second side of the supporting surface, opposite the first side, and a plurality of spikes, wherein each spike of the plurality of spikes is connected to the support projecting essentially from the point of local elevation minimum and projecting into the first space, and includes a fluid inlet on the exterior surface of the each spike, the fluid inlet being connected to a passage internal to the each spike through which fluid or air can flow between the first space and the second space; and wherein at least two spikes in the plurality of spikes protrude to different extents into the second space, wherein when the fluid dispensing system is in use, the first space and the second space are sealed together such that the first space and the second space are in fluid communication only through the passages.

Also disclosed herein is a fluid dispensing system comprising a dispensing base, an enclosed chamber positioned interior to the base, a support means for supporting a bag containing fluid external to the dispensing base, a means for allowing the fluid in the bag to flow into the enclosed chamber, a means for allowing the return of air into the bag from the enclosed chamber, and a means for dispensing fluid from the enclosed chamber to a space external to the dispensing base.

Also disclosed herein is a bag from which fluid is to be dispensed comprising a non-rigid outer surface, a fluid sealed inside the non-rigid outer surface, wherein the non-rigid outer surface is sufficiently weak to be penetrated by all of a plurality of dispensing spikes, when the bag is dropped on the spikes from a height of no more than a few inches, and wherein the non-rigid outer surface forms a seal about each of the plurality of dispensing spikes when penetrated by the spikes.

DESCRIPTION OF PREFERRED EMBODIMENT(S)

It is understood by one of ordinary skill in the art that while this disclosure focuses on water storage and delivery, it pertains to any liquid that needs to be transported in bulk, kept free from contamination, and dispensed in smaller quantities than that in which it is transported.

It is also understood by one of ordinary skill in the art that while this disclosure principally describes a multi-spike adapter which comprises two spikes, any number of spikes may be used to achieve the purposes of dispensation and pressure release.

Figure 1:
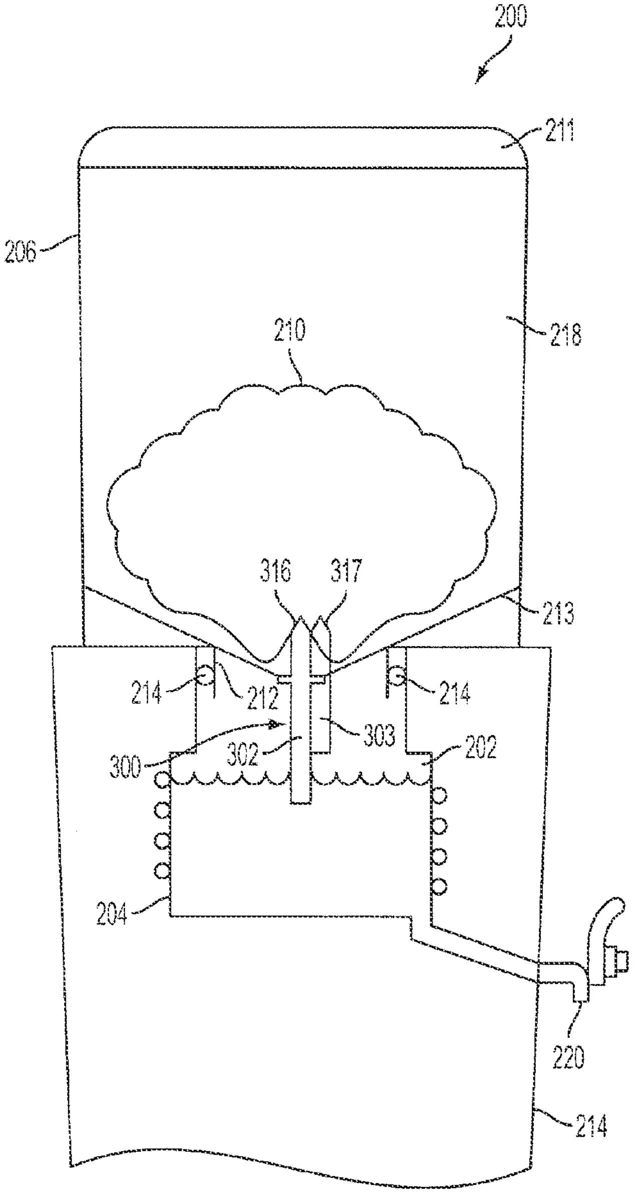
FIG. 1 provides a side perspective view of an embodiment of a bag cooler system with one embodiment of the multi-spike adapter and converter.

Turning now to FIG. 1, a fluid dispensing system 200 in accordance with a preferred embodiment of the invention is shown which can be used to dispense fluid from a collapsible bag 210. This embodiment comprises an enclosed chamber 202 into which fluid from a collapsible bag 210 can flow, and from which fluid can be dispensed from a tap 220. A support 206 rests on top of a dispensing base 208 and is used to support the bag 210. In an embodiment in which the support 206 is capable of holding a fluid, the fluid dispensing system 200 can operate to dispense a fluid that has been placed directly into the support 206; however, a preferred method to supply fluid to the fluid dispensing system 200 is through use of a sealed bag 210 containing fluid. When the fluid is contained in a sealed bag 210 there are significant advantages in terms of maintaining the quality of the fluid. Additionally, when the fluid is supplied in a sealed bag 210 the support 206, itself, need not be constructed to contain the fluid, but need only support the bag 210 containing the fluid. In an embodiment using the support 206 to support a bag of fluid rather than actually to contain fluid, there is significant latitude in the design of the support 206.

In the embodiment shown in FIG. 1, the support 206 has a collar 212 that extends into the chamber 202. A gasket 214, such as a malleable o-ring, circumscribes and is connected to the collar 212 and fits snuggly against a wall of the chamber 202. In an alternate embodiment the gasket 214 is connected to and generally fixed in place with respect to the chamber 202. In either case, when the support 206 is positioned adjacent to the cooler base 208, the collar extends into the chamber 202 and the gasket 214 fits snuggly between the chamber 202 and the collar 212 forming a generally airtight seal. It should be understood that the purpose of the gasket as shown is to enclose the chamber 202 and that more complex systems can be designed to achieve the same effect. For example, in an embodiment where the chamber 202 is separable from the cooler base 208, both the chamber 202 and the support 206 are sealed with separate gaskets to the cooler base 208.

In the embodiment shown in FIG. 1, placement of the support 206 onto the cooler base 208 with the collar 212 extending into the cooler base 208, as is shown in FIG. 1, creates an air tight seal between the support 206 and the cooler base 208 as a result of the snug fit created by the gasket 214. Placement of the support 206 onto the cooler base 208 as shown in FIG. 1 encloses the chamber 202, and separates the air space of the chamber 202 from the ambient air space external to the support 206 and external to the cooler base 208. Once the chamber 202 is so enclosed, fluid (including air or water) communication between the two air spaces, i.e., inside and outside the chamber 202, is only possible through either one of the dispensation spike 316 or the vent spike 317.

Figure 3:
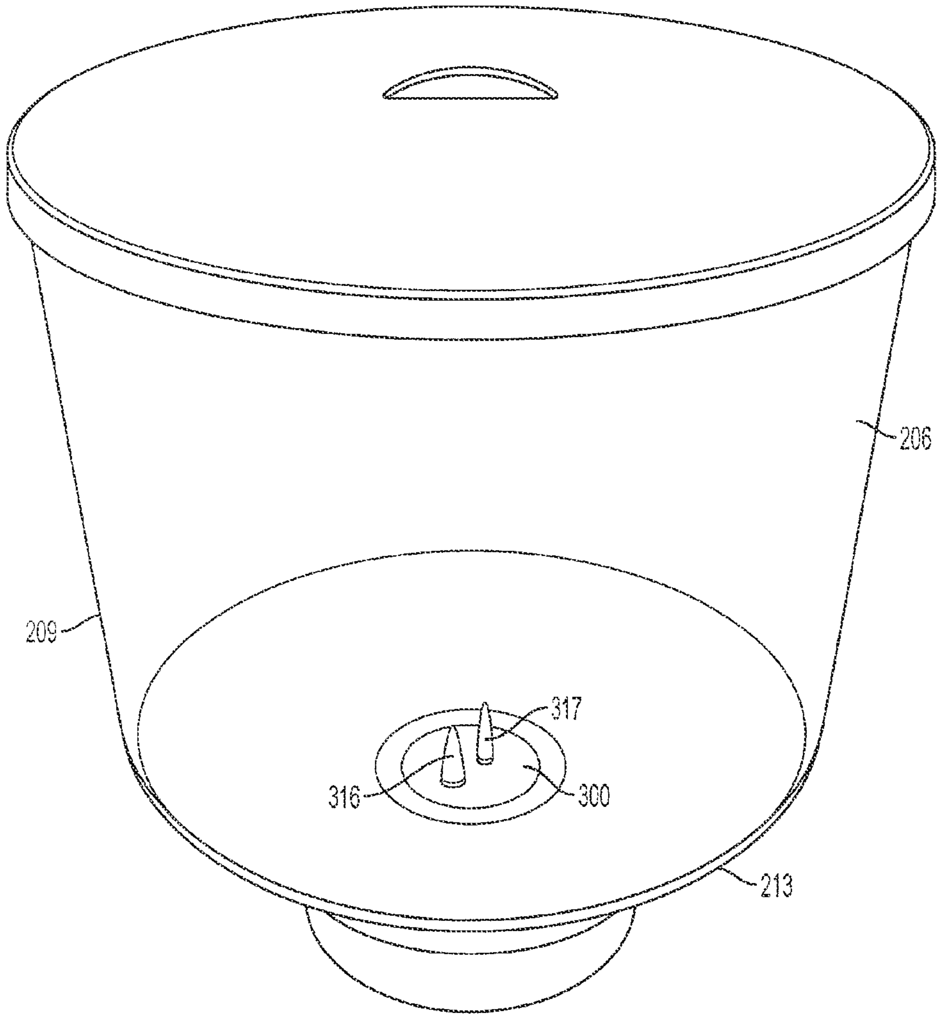
FIG. 3 provides a view of one embodiment of the multi-spike adapter and converter.
Figure 4:
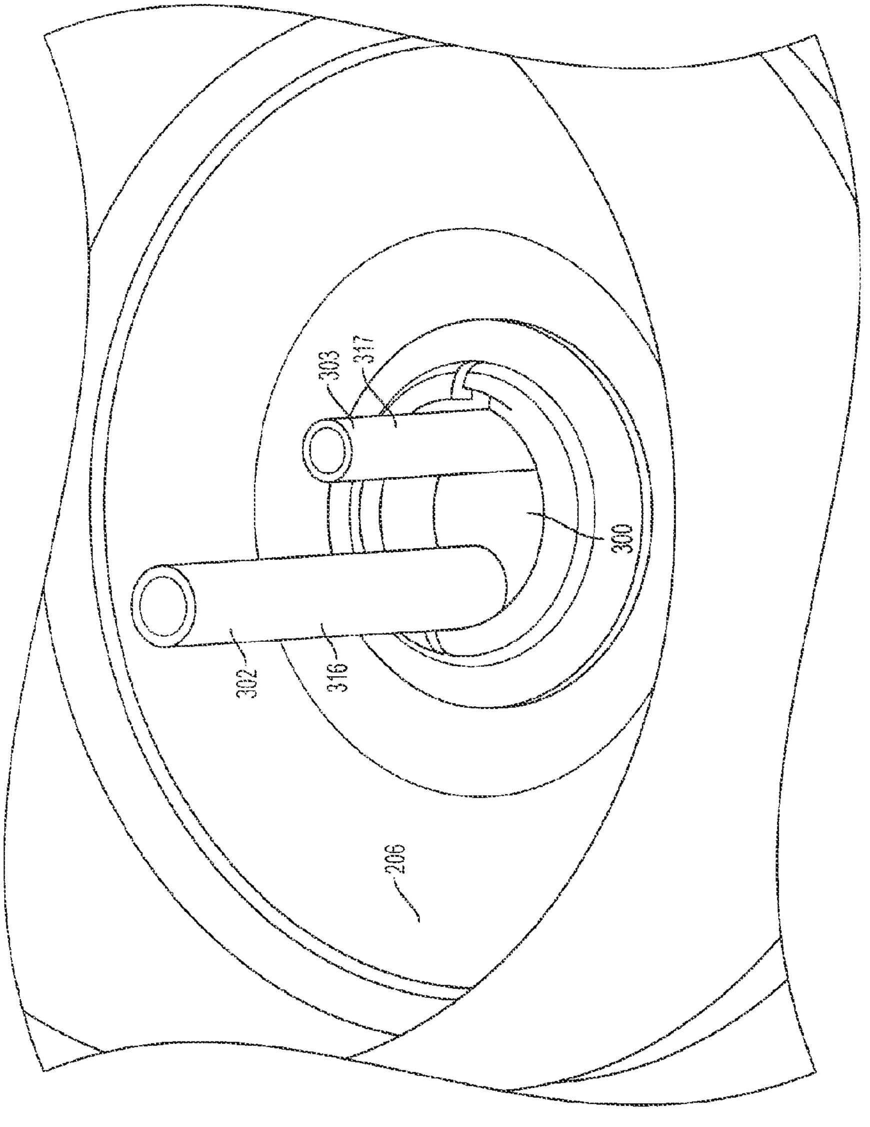
FIG. 4 provides a bottom-side elevation view of one embodiment of the multi-spike adapter and converter.

FIGS. 1 and 3 show various views of a preferred embodiment of the support 206 and various elements connected thereto. The embodiment of the cooler element shown is generally cylindrical, having upright side walls 209, a removable top cover 211, and a bottom surface 213 that is fixed with respect to the side walls 209 and that slants toward a point that is a local minimum in elevation positioned near the geometric center of the bottom surface 213. Spikes 316 and 317 each have an interior fluid passage and are generally positioned at the point of local elevation minimum. In other embodiments the local minimum need not be near the geometric center of the bottom surface 213; it could be positioned off-center. As well, an alternate embodiment of the fluid dispensing system has a support 206 having more than one local minimum in the bottom surface 303, at each of which is placed one or more of spikes 316 and 317. In such an embodiment, the adapter 300 may each feed fluid to a single chamber 202 or they may each feed separate chambers 202. It is not necessary, however, that the adapter 300 be positioned at a local elevation minimum, though doing so is preferable as it aids in emptying fluid supported by the support 206, whether that fluid is contained within a bag 210 or not.

In an embodiment, the combined weight of the fluid and the bag containing the fluid is sufficient to cause the spikes 316 and 317 to puncture the bag once a sealed bag 210 of fluid is placed on the support 206 and on the spikes 316 and 317. In alternate embodiments, it may be necessary to exert an additional force on the bag 210 or the spike in order to enable the spikes 316 and 317 to puncture the bag 210. In an example, such an additional force may be exerted on the bag 210 on a side of the bag 210 generally opposite the spikes 316 and 317. In another example, a spike 316 and 317 that is movable relative to the cooler base 208 may be forced against the bag 210 by any of various mechanisms, including a spring compressed against the cooler base 208. In a preferred embodiment, the additional force is obtained by dropping the bag 210 onto the spikes 316 and 317 from a height of about six inches. In various alternative embodiments the height from which the bag 210 is dropped onto the spikes 316 and 317 may vary significantly, and may be as great as several feet.

Figure 7:
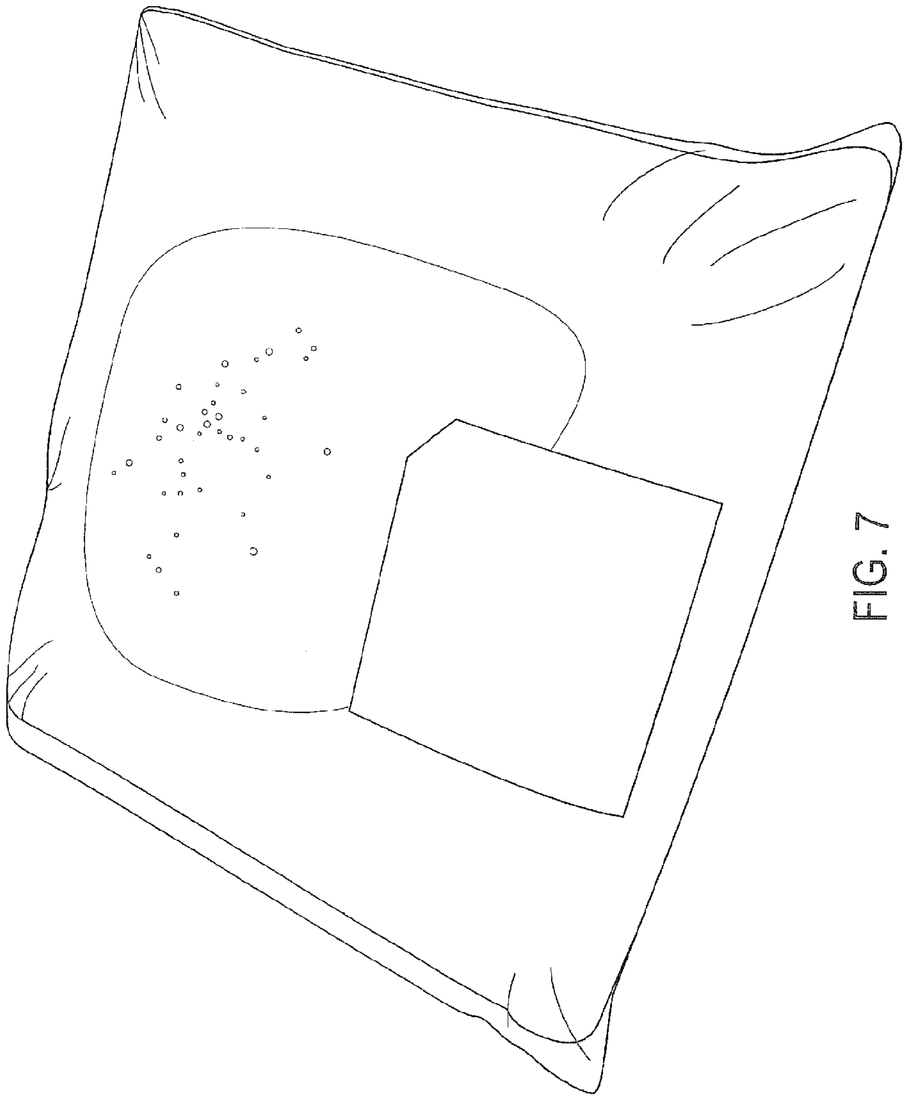
FIG. 7 provides a perspective view of an embodiment of a multi-layer bag system comprising a bag and a sanitizing patch.
Figure 8:
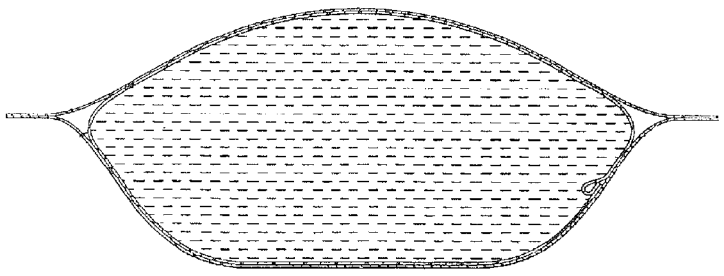
FIG. 8 provides a cross-sectional view of an embodiment of a multi-layer bag system comprising a bag in an overwrap.

In a preferred embodiment, the bag 210 comprises a sealed, flexible bag 210 as illustrated in FIG. 1. Fluid in a bag 210 may be referred to herein as “bagged fluid”. The bag 210 may be made of any suitable material, but is preferably made of a plastic material such as an organic polymer sheet material and is preferably flexible and pliable and does not impart a rigid shape to the fluid. The bag 210 may, however, be filled with fluid to a point that the fluid is under pressure, forming a relatively inflexible combination when the bag is sealed. The bag 210 also may be of any suitable construction. Preferably, the bag 210 to be placed in the cooler comprises a single-layer film wall. In an alternate embodiment a bag 210 may be constructed with several plies of material or a set of bags placed one within another. Such a multi-layer bag system may include what is commonly referred to in the art as a secondary containment or an overwrap, as is shown in FIG. 8, or may include sanitizing “patches” or similar structures on its surface, as is shown in FIG. 7. For a bag 210 having several layers or patches, one or more of the layers or patches may be removed prior to placing the bag 210 in the cooler 206.

In an embodiment such as shown in FIG. 3, the spikes 316 and 317 include a cylindrical shaft 302 and 303 and a blade 304 and 305. Each blade 304 and 305 comprises a circular cone positioned at an end of the corresponding shaft 302 and 303 and has a radius at its base identical to, or slightly smaller than, the largest radius of the shaft 302 or 303. Upon a forceful encounter with the bag 210, the dispensation spike 316 and vent spike 317 both puncture the bag 210. In this configuration, as the bag material is punctured by the point of the cone, the opening in the bag 210 is gradually enlarged as the bag 210 is pushed over the cone of the conical cones and onto the shafts 302 and 303.

The bag 210 and spikes 316 and 317 are preferably constructed so that the bag 210 will seal about the spikes 316 and 317 after the bag 210 is punctured. Such a seal may be dependent upon the materials and dimensions of both of the bag 210 and the spikes 316 and 317. The preferred materials and dimensions for producing such a seal about one spike is described in the U.S. patent application Ser. No. 10/926,604, titled Portable Water Cooler for use with Bagged Fluids and Bagged Fluids for use Therewith, filed on Aug. 25, 2004, which application is herein incorporated by reference in its entirety. The methods and systems therein could be easily applied by one of ordinary skill to the spikes 316 and 317 herein without undue experimentation.

Figure 5:
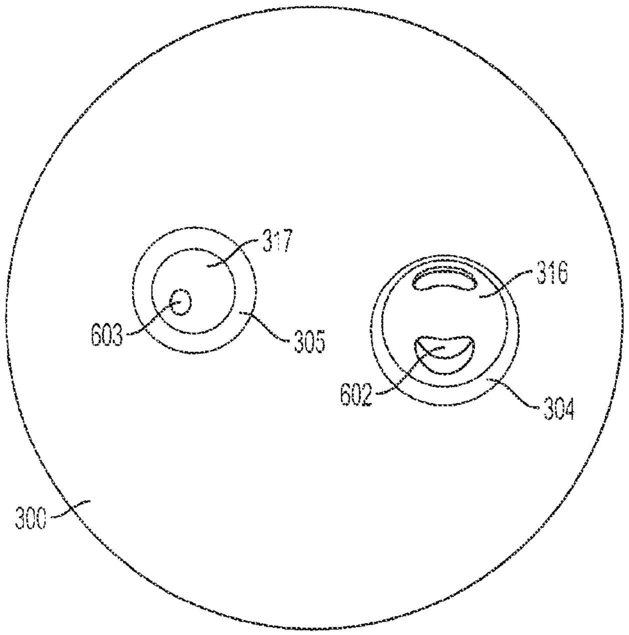
FIG. 5 provides a top elevation view of one embodiment of the multi-spike adapter.
Figure 6:
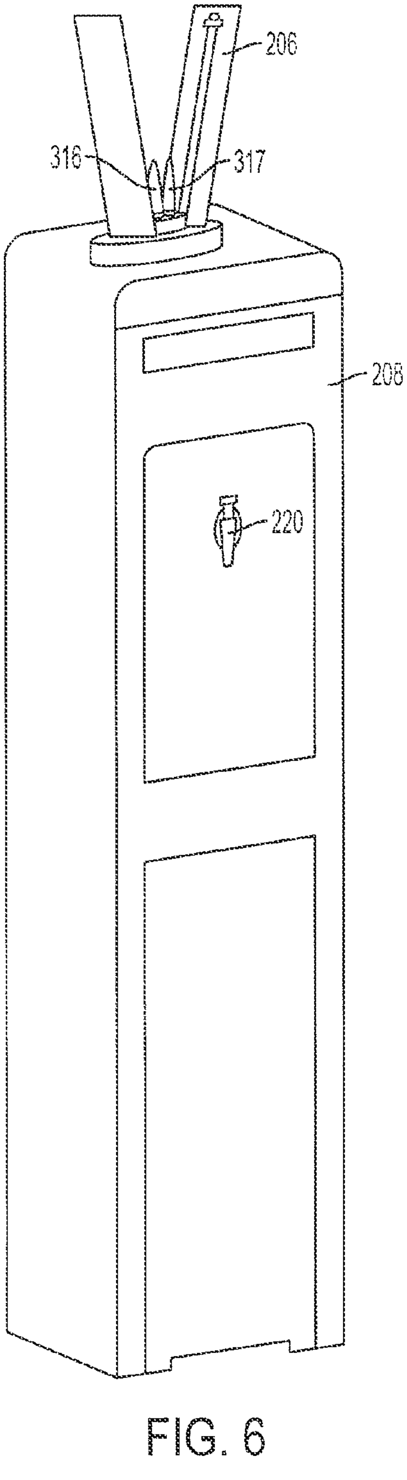
FIG. 6 provides a side elevation view of an embodiment of the support mechanism and multi-spike adapter which does not require an enclosed bag support.

The spikes 316 and 317 will each generally include a plurality of fluid inlets 602 or 603, which, after the puncturing of the bag 210 by the spikes 316 and 317, allow fluid contained in the bag 210 to enter the hollow shafts 302 or 303 of the spikes 316 and 317. In a preferred embodiment, the fluid inlets 602 and 603 are positioned in the side wall of the blades 304 or 305 of the spikes 316 and 317, though in alternate embodiments the fluid inlets 602 and 603 are positioned elsewhere on the spike, including on the shafts 303 and 304. In an embodiment, illustrated in FIGS. 2 and 5, the inlet 603 to the vent spike 317 is smaller than the inlet 602 to the dispensation spike 316 so that upon initial puncturing, minimal fluid travels through the vent spike 317 while air can freely flow through the vent spike 317 into the bag 210. In another embodiment, the inlet 603 in the vent spike 317 may be on the side of the vent spike shaft 303 rather than the blade 307 such that gravity creates less pressure on fluid to enter the vent spike 317.

Figure 2:
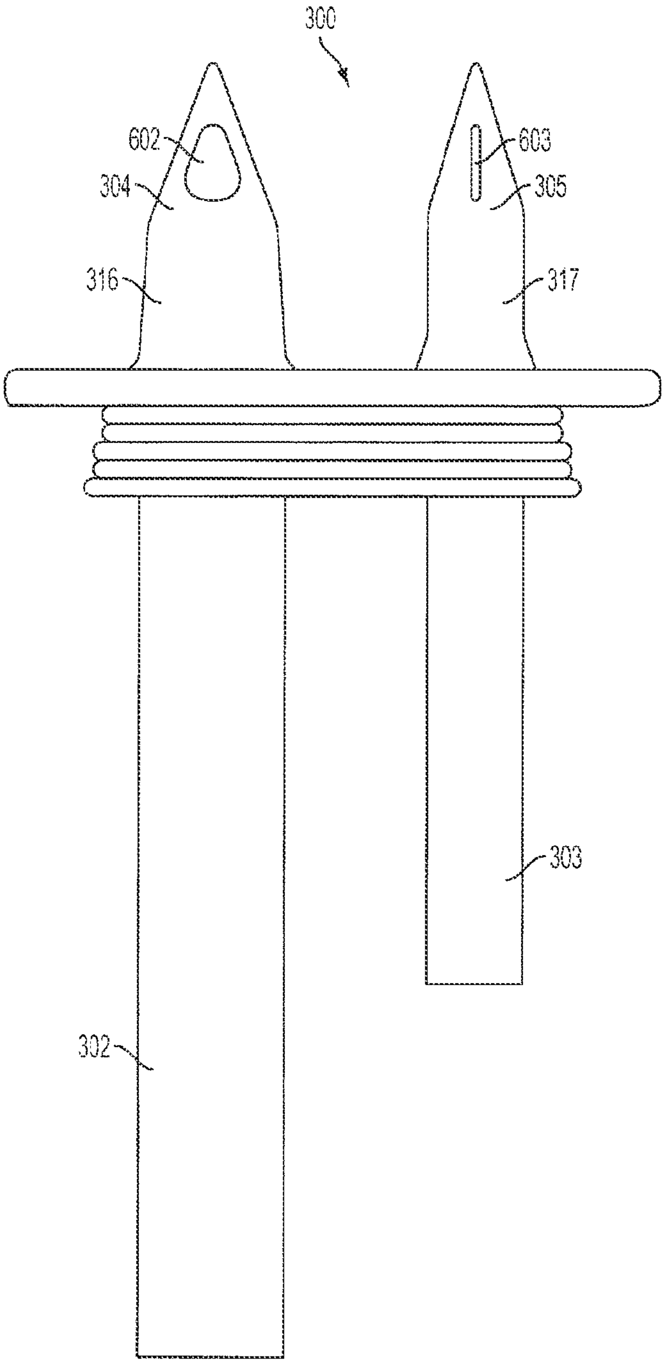
FIG. 2 provides a side elevation view of the multi-spike adapter of FIG. 1.

The dispensation spike 316 generally has a longer shaft 302 than the vent spike 317 shaft 303, as illustrated in FIGS. 1, 2 and 4, although that is not required. This arrangement provides that the dispensation shaft 302 protrudes into the chamber 202 further than the vent shaft 303. When the bag 210 is initially punctured and situated such that fluid flow out of the bag is encouraged by gravity, pressure, or any other means, fluid in the bag 210 enters the holes in both spikes 316 and 317. The chamber 202, closed at the spigot 220, fills with fluid released through both spikes 316 and 317. However, it will generally occur primarily through the dispensation spike 316 which is generally adapted to permit water flow more easily than does the vent spike 317.

As fluid continues to flow from the bag 210 into the chamber 202, the level of fluid contained in the chamber 202 continues to rise. Water in the chamber 202 will displace the air in the chamber 202, forcing the air to seek escape from chamber 202. The only opening not effectively blocked with water is vent spike 317, which will result in air generally passing upward through spike 317 and with some air passing through spike 316. Fluid and air flow generally continues through both spikes 316 and 317 until the fluid in the chamber 202 accumulates to the point of reaching the terminus of the dispensation shaft 302 at which point air can no longer flow into dispensation spike 316. As water will, however, continue to flow as there is no vacuum in the bag 210, air will be forced in greater amount up the vent spike 317. Once the water reaches the bottom of the vent spike 317, the air can no longer escape from chamber 202. At that point, some air remains in the chamber 202. Water will continue to flow into the chamber 202 which will pressurize the air remaining, which cannot escape, as the water level in the chamber 202 continues to increase. Eventually, this pressure will equal that exercised by gravity and external pressure on the water feeding the chamber 202, and water flow will cease as the pressures equalize. This process is illustrated at a midpoint in FIG. 1.

Upon the puncturing of a sealed bag 210 by the spikes 316 and 317, the fluid path out of the chamber 202 through the spikes 316 and 317 has become sealed relative to the ambient environment external to the cooler base 208. That is, after the puncturing of the bag 210, there is no connection between the external environment and the chamber 202. The vent spike 317 then becomes the only passage through which to equalize the pressure between the chamber 202 and vents air into the bag 210.

Thus, if the pressure in the chamber 202 is less than the pressure exerted by the bag 210, fluid continues to flow into the chamber 202. The pressure in the chamber 202, however, begins to rise. Fluid flows into the chamber 202 and the pressure in the chamber 202 rises until the point where the pressure in the chamber 202 equals the water pressure from the bag 210. At this point, flow from the bag 210 into the chamber 202 will stop as pressure equalizes.

Now with fluid in the chamber 202, the same fluid can be dispensed through the tap 220. When the tap 220 is opened to allow fluid to be dispensed from the chamber 202, the water level in the chamber 202 decreases, until eventually the fluid level in the chamber 202 is lower than the inlet of the vent spike 317. During dispensing, the pressure in the chamber 202 is reduced from the value at equilibrium (no flow), thus allowing fluid to begin again to flow from the bag 210 into the chamber 202. So long as the volume fluid flow through the spikes 316 and 317 are less than the volume fluid flow through the tap, the fluid level in the chamber 202 continues to decrease as the fluid continues to be dispensed. So long as the volume rate of flow out of the tap 220 (i.e., out of the chamber 202) is greater than the combined volume rate of flow into the chamber 202 through the dispensation spike 316, the pressure in the chamber 202 will also continue to decrease.

When the tap 220 is finally closed, the reduced pressure in the chamber 202 will add to the total force working to move fluid from the bag 210 into the chamber 202. Not only will gravity be pulling the fluid through the dispensation spike 316, but also pressure external to the bag 210 will be pushing the fluid through the dispensation spike 316 into the chamber 202. Such a chamber 202 in which pressure is reduced during dispensing is beneficial to the evacuation of fluid from the bag 210 to the greatest extent, since, in effect, the reduced pressure in the chamber 202 results in a greater net force working to push fluid out of the bag 210. As stated above, these forces will work to move fluid from the bag 210 into the chamber 202 until all forces are equilibrated. In the event that the fluid in the bag 210 is exhausted, the vacuum in the chamber will generally pull air from the bag 210 into the chamber 202, collapsing the bag and draining any remaining water into the spike 316.

In a case where a new bag 210 full of fluid is punctured by the spikes 316 and 317, it is possible that there will be a transient increase in pressure in the chamber 202, especially if the bag 210 is dropped onto the spikes 316 and 317, as in the preferred embodiment discussed above.

While the embodiment disclosed herein utilizes one dispensation spike 316 and one vent spike 317, it is known to those of reasonable skill in the art to use varying numbers and proportions of spikes 316 and 317. For example, an adapter 300 may utilize more than one dispensation spike 316, in order to, among other purposes, increase the flow of water during dispensation. Another adapter 300 embodiment may combine the functionality of the dispensation spike 316 and vent spike 317 into one spike with two segregated shafts of differing lengths, in order to, among other purposes, limit the number of times the bag 210 is punctured but still achieve the solution to the pressure flow problem. In another embodiment, an adapter 300 may utilize multiple vent spikes 317 to facilitate pressure alleviation.

A fluid dispenser with multispike adapter 300 of the present invention can be fabricated new, or portions thereof can be manufactured to retrofit other existing portions thereof in order to construct a complete embodiment of the present invention. Particularly, a support 206 can be manufactured to fit with an existing cooler base 208 having a chamber 202. Where a support 206 is manufactured to retrofit an existing cooler base 208, the design of the support 206 may take account of and incorporate the use of various components of the existing cooler base 208, or other components of an existing dispensing system attached thereto, such as, for example, any portions designed to isolate the chamber 202 from external environmental influences.

The vent spike 317 and multi-spike adapter 300 can provide for a bag dispensing system which, once a water bag 210 is punctured, forms a sealed system. Unlike the vent straw, which provides for external pressure equalization by having an external opening, the multispike system water path is generally sealed. Air and water can only flow between the chamber 202 and bag 210 until the tap 220 is opened. Fluid does not stagnate in the vent spike 317 and cannot become contaminated by external sources. Because of the fluid's pressure bearing down on the vent spike 317, any fluid excreted from the vent spike 317 upon initial puncturing of the bag generally cannot travel back "upstream" and reenter and contaminate the bag 210.

The multi-spike adapter 300 also achieves the goal of solving the pressure flow problem without requiring use of an external modification to support 206. Unlike the vent system, the multi-spike adapter is ensconced at the base of the support

206 and need not be visible. The bag and cooler retain their structural integrity when the pressure flow problem is solved by the multi-spike adapter.

While the invention has been disclosed in connection with certain preferred embodiments, this should not be taken as a limitation to all of the provided details. Modifications and variations of the described embodiments may be made without departing from the spirit and scope of the invention, and other embodiments should be understood to be encompassed in the present disclosure as would be understood by those of ordinary skill in the art.

The invention claimed is:

1. A method for preparing fluid for dispensing, the method comprising:

providing a dispensing system comprising:

a dispensing base;

a chamber positioned interior to said base from which a fluid can be dispensed;

a support external to said dispensing base;

a bag containing fluid;

two independent spikes situated in said support and protruding to different extents from said support into said enclosed chamber dropping said bag containing fluid into said support in a manner such that said spikes puncture said bag containing fluid when said bag containing fluid contacts said spikes;

flowing fluid from said bag containing fluid through at least one of said spikes into said enclosed chamber wherein prior to the dropping of said bag, a protective outer layer enclosing said bag is removed from about said bag.

2. A method for preparing fluid for dispensing, the method comprising:

providing a dispensing system comprising:

a dispensing base;

a chamber positioned interior to said base from which a fluid can be dispensed;

a support external to said dispensing base;

a bag containing fluid;

two independent spikes situated in said support and protruding to different extents from said support into said enclosed chamber dropping said bag containing fluid into said support in a manner such that said spikes puncture said bag containing fluid when said bag containing fluid contacts said spikes;

flowing fluid from said bag containing fluid through at least one of said spikes into said enclosed chamber wherein prior to the dropping of said bag, a protective patch covering a portion of said bag is removed from said bag.

* * * * *